United States Patent [19]

Jensen

[11] Patent Number: 5,075,942

[45] Date of Patent: Dec. 31, 1991

[54] TIRE RASP BLADE

[75] Inventor: Wayne E. Jensen, Olympia Fields, Ill.

[73] Assignee: B & J Manufacturing Company, Glenwood, Ill.

[21] Appl. No.: 166,176

[22] Filed: Mar. 10, 1988

[51] Int. Cl.$^5$ ............................................. B23D 71/00
[52] U.S. Cl. ........................................ 29/78; 29/76.1; 407/61; 407/62
[58] Field of Search .................. 407/56, 60, 61, 62; 29/76.1, 78

[56] References Cited

U.S. PATENT DOCUMENTS

| | | | |
|---|---|---|---|
| 156,748 | 11/1874 | Andrews | 407/61 |
| 2,896,309 | 7/1959 | Jensen | 29/79 |
| 2,975,504 | 3/1961 | Bentham | 29/76.1 |
| 3,680,185 | 8/1972 | Wood et al. | 29/79 |
| 4,091,516 | 5/1978 | Jensen et al. | 29/79 |
| 4,747,194 | 5/1988 | Wood et al. | 29/78 |

Primary Examiner—James G. Smith
Assistant Examiner—Jack Lavinder
Attorney, Agent, or Firm—Niro, Scavone, Haller & Niro

[57] ABSTRACT

A tire rasp blade has a planar body portion and a working edge portion. The working edge comprises a combination of adjacent, or closely aligned teeth and spaced teeth. The trailing edges of any one adjacent tooth is displaced from the plane of the body portion to one side of the blade and the leading edge of the next following adjacent tooth is displaced to the opposite side of the blade.

24 Claims, 3 Drawing Sheets

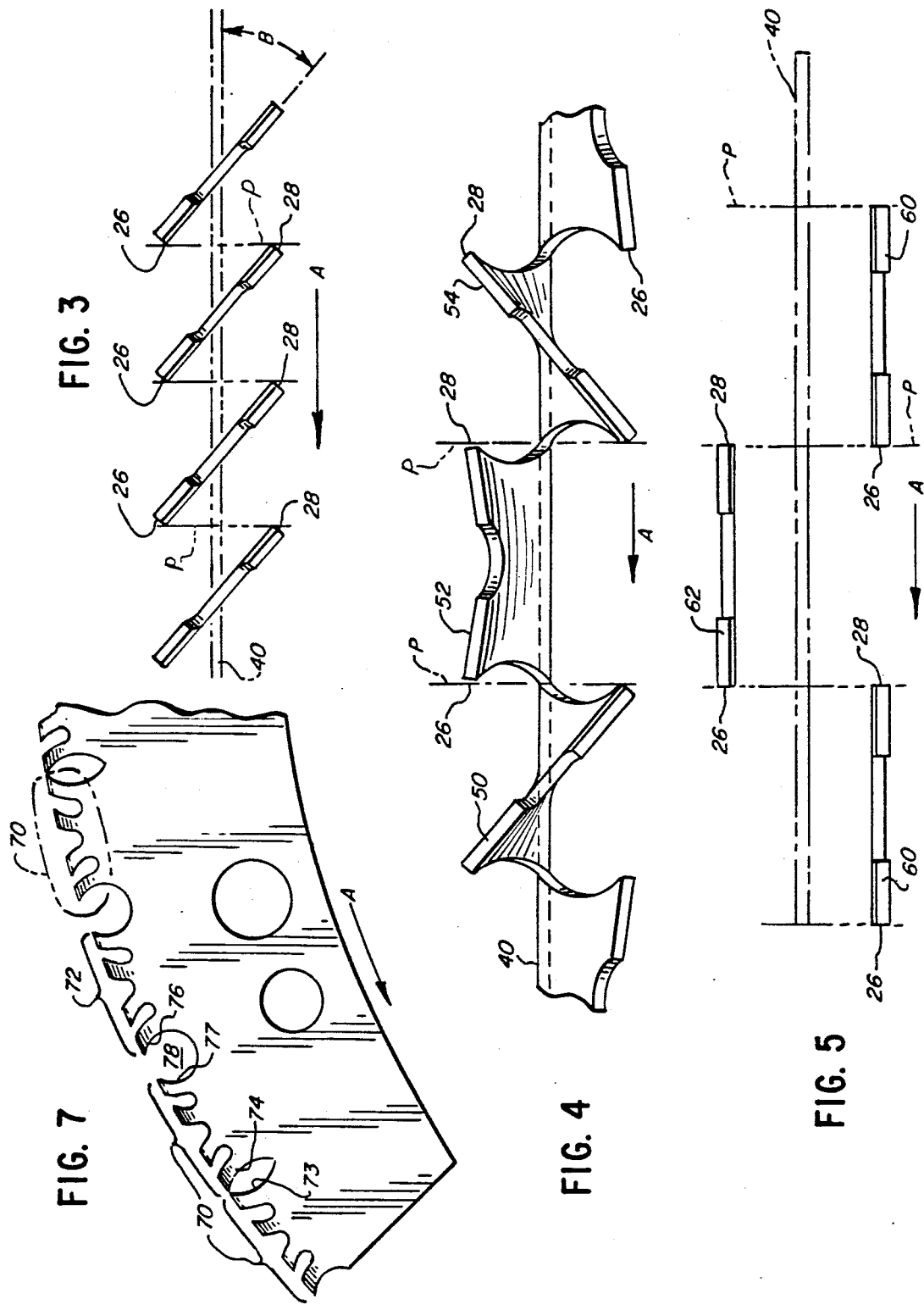

TIRE RASP BLADE

BACKGROUND OF THE INVENTION

The present invention relates to an improvement in rasp blades used on tire buffing machines to properly precondition tires in preparation for retreading. More particularly, the present invention relates to a tire rasp blade having novel and improved construction of the blade's working edge.

Tire rasp blades have been used for many years in the tire retreading industry. These blades are mounted to the rotating hub of the tire buffing machine and, when engaged with the used tire carcass, they cut, shear or tear small segments of rubber from the tread surface area of the tire. In this way, the tire tread area is "buffed" to achieve an evenly textured surface suitable for retreading. Among the many performance characteristics of such rasp blades, the speed or efficiency of rubber removal is important. However, it is also essential that such blades exhibit good durability—that is, the teeth disposed on the blades should not tear, break or otherwise fail prematurely. It is also desireable that the blades not generate excessive heat during the buffing operation, since the tire surface can be damaged by increased temperatures with the result that an effective retread is not possible.

There are a number of prior art rasp blades that have been developed to meet the performance characteristics noted above. Such rasp blades are disclosed, for example, in U.S. Pat. Nos. 3,879,825; 4,021,899; 4,091,516; and 4,283,819. There still exists a need, however, for a durable tire rasp blade with minimum or no tooth breakage that operates to remove rubber from the tire at a faster rate, while providing excellent surface texture on the buffed tire and maintaining relatively lower buffing temperatures.

SUMMARY OF THE INVENTION

The present invention is directed to a tire rasp blade having a novel working edge construction which has been found to be particularly effective in removing rubber from the tread surface area of the tire, as well as durable and resistant to both tooth breakage and heat generation. The invention finds its genesis in the recognition that it is very desirable to utilize a greater number of teeth per unit length of working edge, while at the same time assuring that each tooth is positioned to properly address the tire surface during the buffing operation.

In accordance with the present invention each of these objectives is achieved by a tire rasp blade having both a body portion and a working edge portion. The body portion is adapted for assembly to the rotating hub of the tire buffing machine. The working edge portion is positioned on the body portion so as to protrude from the periphery of the hub during operation of the buffing machine, and includes a unique combination of adjacent and spaced teeth which together provide the combination of desirable properties mentioned above.

The term "adjacent" as used in the context of the present invention is intended to mean that the trailing edge of one tooth and the leading edge of the next following tooth are very closely positioned longitudinally along the circumference of the working edge portion. On the other hand, "spaced" teeth are those having a substantial longitudinal spacing between the trailing edge of one tooth and the leading edge of the next following tooth.

As is customary in the tire rasp blade art, the teeth of the blade's working edge are displaced, either angularly or laterally, from the plane of the blade's body portion. However, in accordance with the present invention, the adjacent teeth are displaced from the plane of the body portion so that the trailing edge of any one of the adjacent teeth is positioned on the opposite side of the blade from that of the leading edge of the next following adjacent tooth.

In accordance with another embodiment of the invention, the adjacent teeth are disposed along the working edge portion of the blade in groups. These groups of adjacent teeth are, in turn, separated by the spaced teeth.

BRIEF DESCRIPTION OF THE DRAWINGS

The novel features of the invention are set forth in the appended claims. However, the invention's preferred embodiments, together with further objects and attendant advantages, will be best understood by reference to the following description taken in connection with the accompanying drawings in which:

FIG. 3 is a partial plan view of the working edge of a rasp blade, illustrating one preferred arrangement of adjacent teeth in accordance with the present invention;

FIG. 4 is a partial plan view of the working edge of a rasp blade, illustrating another preferred arrangement of adjacent teeth;

FIG. 5 is a view similar to FIGS. 3 and 4, illustrating still a further preferred arrangement of adjacent teeth;

FIG. 6 is a side elevational view similar to FIG. 1 showing another tire rasp blade made in accordance with still another embodiment of the present invention and FIG. 7 is an enlarged partial side elevational view of a tire rasp blade made in accordance with another embodiment of the present invention.

DESCRIPTION OF THE PREFERRED EMBODIMENTS

Figures 1, 2:
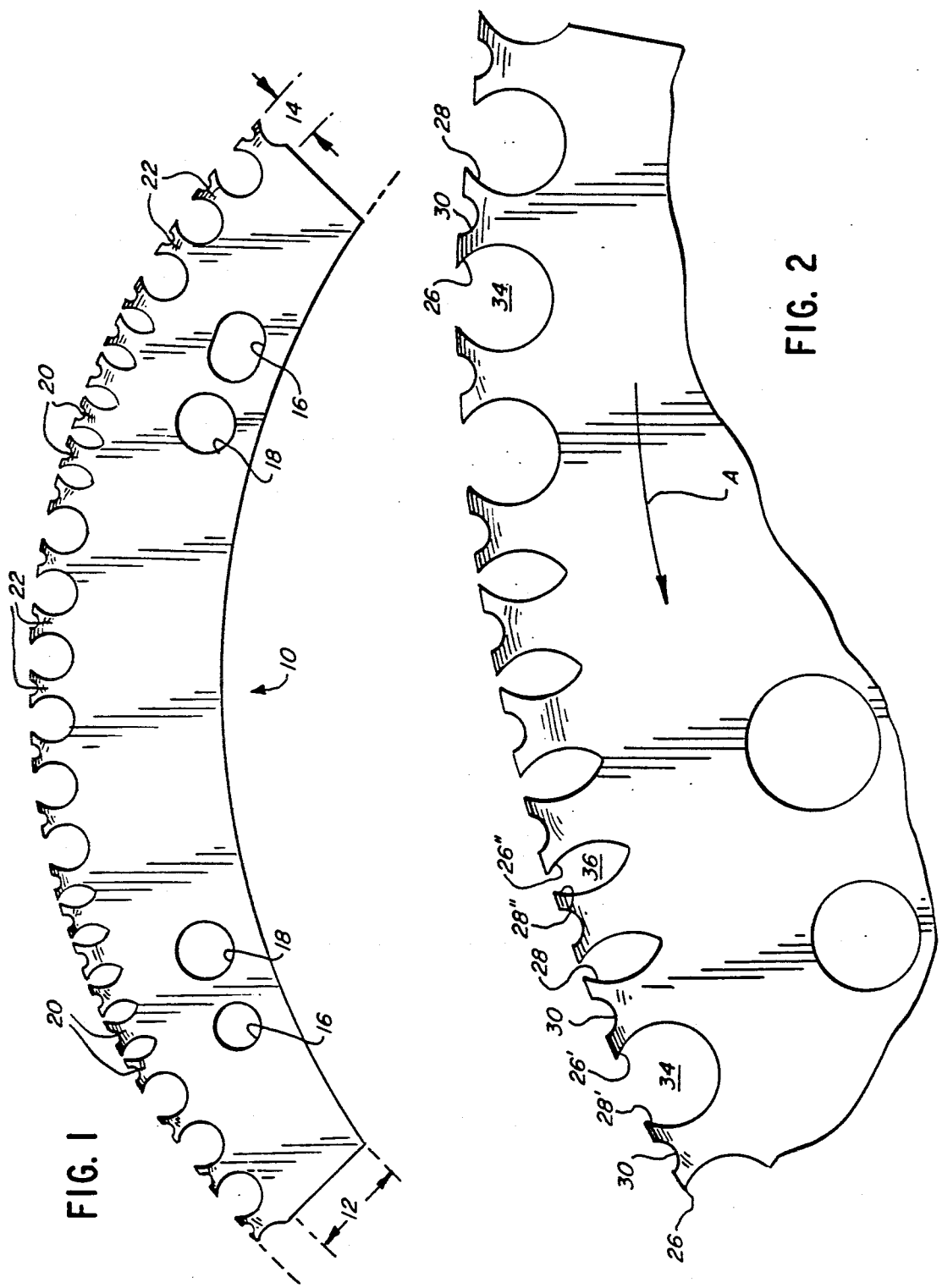
FIG. 1 is a side elevational view illustrating a tire rasp blade made in accordance with one embodiment of the present invention.
FIG. 2 is an enlarged partial side elevational view of the rasp blade of FIG. 1.

With reference to FIG. 1, a tire rasp blade, designated generally as 10, is shown having a body 12 and a working edge 14. It will be appreciated by those skilled in the art that body 12 is generally planar and is adapted for assembly, by means of mounting holes 16 or 18, to the rotatable rasp hub of a tire buffing machine. Of course, several such blades 10 are used in the machine hub assembly and together they act to remove rubber from the used tire carcass and to condition the tire tread surface area in preparation for a subsequent retreading process.

The working edge 14 of blade 10 is the outer, circumferential part of the blade that contacts the tire and includes a combination of "adjacent" teeth 20 and "spaced" teeth 22. The precise geometric configuration of the teeth 20 and 22 may vary somewhat in accord with the teachings of the prior art. However, particularly preferred tooth configurations are described in detail in U.S. Pat. Nos. 2,896,309; 3,082,506; 3,618,187; 3,879,825; 4,021,899; 4,059,875; and 4,091,516 the disclosures of which are incorporated herein by reference.

As illustrated more clearly in FIG. 2, the teeth 20 and 22 used in this embodiment have a common size and configuration with leading edges 26 which attack the confronting tire tread surface upon rotation of the buffing rasp hub. Each tooth also has a trailing edge 28. Of course, the terms "leading" and "trailing" find their significance in relation to the movement of blade 10 as the rasp hub rotates. Blade movement is designated in the drawings by Arrow A. It is also desirable that each tooth include a centrally located semi-circular, v-shaped (or otherwise configured) cutout 30. The leading edges 26 and trailing edges 28 are defined by the size and shape of the cutouts 34 and 36. As illustrated in FIG. 2 the leading edges 26 for both the spaced and adjacent teeth having generally the same configuration. However, the leading edge 26' defined by wide generally circular shaped cutout 34 is spaced a substantial longitudinal distance from its associated trailing edge 28' defined by the same cutout, whereas the leading edge 26" defined by narrow generally elliptical shaped cutout 36 is immediately adjacent to, and is not longitudinally spaced from trailing edge 28" also defined by cutout 36. In this way the respective adjacent or spaced teeth are formed in the working edge 14 of the blade.

Adjacent teeth are formed in accordance with the present invention by first making the cutouts 36 in the blade 10 so that the trailing edge of one adjacent tooth is virtually contiguous with the leading edge of the next following adjacent tooth. The adjacent teeth are then displaced, either angularly or laterally as explained later. Thus, the trailing edge of one adjacent tooth and the leading edge of the next following adjacent tooth terminate substantially in a common plane normal to the plane of the blade's body portion. By way of example, in the preferred embodiments of the present invention, the span of the narrow cutout 36 at its widest mid-section is about 0.130 inch and the longitudinal distance between the trailing edge and leading edge of adjacent teeth 20 is less than about 0.040 inch. On the other hand, the span of the wide cutout 34 at its widest mid-section is about 0.200 inch and the longitudinal distance between the trailing edge and leading edge of spaced teeth is at least 0.100 inch. In the embodiment illustrated in FIGS. 1 and 2, both the wide and narrow cutouts have a substantially common depth, thereby defining both spaced and adjacent teeth of substantially common size.

As a result of the use of adjacent teeth, more leading edges can be employed per unit length of the blade and a more aggressive action, or faster rubber removal, can be achieved. And because more teeth are doing the work of rubber removal, each tooth is subject to less stress with the result that teeth of substantially the same configuration and dimension tend to exhibit better wear, are more durable and less subject to breakage as compared to prior art blades.

With this concept in mind, it appears logical to construct the working edge 14 using only adjacent teeth. However, at present such a blade construction has been found to be too aggressive, creating excessive heat and smoke. Moreover, the resulting tire surface is not evenly textured. As a consequence, it has been determined that a combination of both adjacent and spaced teeth is necessary to achieve the most desired balance of properties. In accordance with the present invention, therefore, the adjacent teeth are positioned along the working edge 14 of blade 10 in groups, with each group being separated by spaced teeth. Groups of between two and seven adjacent teeth are preferred, and groups of at least three adjacent teeth and at least three spaced teeth are particularly preferred. Thus, a balance is achieved between more efficient rubber removal and the need to achieve optimum surface texture without excessive heat generation. It has also been determined that a rasp blade having between about 25% to 50% of its circumferential working edge made up of adjacent teeth provides these desired combinations of functional characteristics.

Another facet of the tire rasp blade design of the present invention is the orientation of the adjacent teeth. When using adjacent teeth, care must be taken to assure that their leading edges are positioned to properly address the tire surface for effective rubber removal. Specifically, the leading edge of each adjacent tooth must not be blocked from the tire surface by the trailing edge of the immediately preceding adjacent tooth. Thus, in accordance with the present invention, the adjacent teeth 20 are displaced from the plane of the blade body portion such that the trailing edge 28 of any adjacent tooth 20 is located on an opposite side of the body portion plane to that on which the leading edge 26 of the next following tooth 20 is located.

Figure 6:
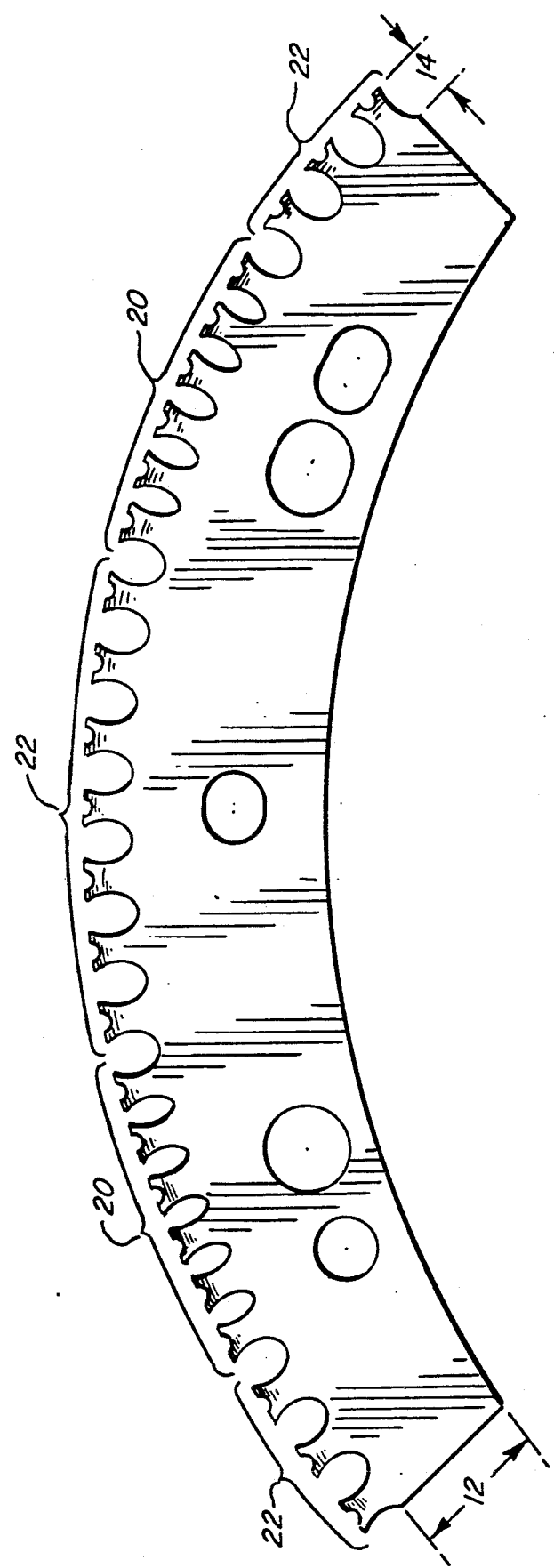

These design parameters are all employed in the tire rasp blade illustrated in FIG. 6. This blade has a working edge portion 14 with a longitudinal (i.e. circumferential) dimension of approximately 6.875 inches. There are two groups of six adjacent teeth 20 separated by a group of spaced teeth 22. Each end of the blade also includes spaced teeth 22. The adjacent teeth occupy approximately 2.375 inches of the working edge while the spaced teeth occupy approximately 4.50 inches. Thus, the adjacent teeth comprise approximately 35% of the working edge 14. The blade illustrated in FIG. 6 exhibits exceptional rubber removal rates in conventional buffing machines; as a result, fewer blades may be used across the rasp hub section. Equally important, the blade produces a very high quality tread surface area texture without generating excessive heat. And all of this is achieved while retaining outstanding durability—as much as 20% longer useful life. In short, the tire rasp blade of the present invention outperforms any other known prior art blade.

Several preferred embodiments of the invention are illustrated in FIGS. 3-5. In FIG. 3, the adjacent teeth 20 are angularly displaced at a common angle B relative to plane 40. In FIG. 4, one adjacent tooth 50 is disposed at an angle to plane 40, whereas the next following adjacent tooth 52 is laterally displaced generally parallel to plane 40, and the next following adjacent tooth 54 is again disposed at an angle to plane 40. FIG. 5 shows adjacent tooth 60 laterally displaced to one side of and generally parallel to plane 40 with adjacent tooth 62 laterally displaced to the other side again generally parallel to the plane 40. In each of these embodiments, the trailing edge 28 of any given adjacent tooth must not interfere with or obstruct the action of leading edge 26 on the next following tooth. Nevertheless, the trailing edge of any adjacent tooth and the leading edge of the next following adjacent tooth each terminates in a substantially common place P which is normal tot he plane 40.

As best illustrated in FIGS. 3-5, it is also preferred to offset, or further displace, the distal edges of the teeth. This offset is made in a direction away from the plane 40 and in an amount roughly equivalent to the material thickness.

The embodiment illustrated in FIG. 7 demonstrates that the invention is not limited to any particular tooth design. In this embodiment, the adjacent teeth 70 and spaced tooth 72 have a more complex configuration; however, the trailing and leading edges, 73 and 74 respectively, of the adjacent teeth are still closely aligned, and the leading edge 76 of spaced tooth 72 is substantially spaced from the trailing edge 77 of the preceding tooth by cutout 78.

It will be appreciated by those skilled in the art that various modifications and changes can be made to the illustrated embodiments without departing form the spirit of the present invention. All such modifications and changes are intended to be covered by the appended claims.

I claim:

1. A tire rasp blade for use in a tire buffing machine, said tire rasp blade comprising:
   a generally planar body portion adapted for assembly in a rotating hub of the tire buffing machine; and
   a working edge portion positioned on said body portion to protrude for the hub periphery and comprising a plurality of teeth having a substantially common size and configuration, said teeth also having leading edges that attack the tire surface as the hub rotates in the operation of the buffing machine and trailing edges there behind, said plurality of teeth including a combination of adjacent teeth and spaced teeth, and said adjacent teeth being displaced from the plane of said body portion so that the trailing edge of any one adjacent tooth is one the opposite side of said plane to that of the leading edge of the next following adjacent tooth.

2. The tire rasp blade of claim 1 wherein said adjacent teeth are positioned in groups along said working edge portion of said blade, each group including between two and seven adjacent teeth.

3. The tire rasp blade of claim 2 wherein all the adjacent teeth of any one of said groups are angularly displaced from said plane at a common angle.

4. The tire rasp blade of claim 1 wherein all the adjacent teeth are angularly displaced from said plane at a common angle.

5. The tire rasp blade of claim 1 wherein said adjacent teeth are angularly displaced such that the leading and trailing edges of any one of said adjacent teeth are located on opposite sides of said plane.

6. The tire rasp blade of claim 1 wherein said adjacent teeth are laterally displaced such that the leading and trailing edges of any one of said adjacent teeth are located on the same side of said plane.

7. The tire rasp blade of claim 1 wherein said one adjacent tooth is angularly displaced from said plane and said next following adjacent tooth is laterally displaced from said plane.

8. The tire rasp blade of claim 1 wherein said adjacent teeth are positioned in a plurality of groups along said working edge portion of said blade, with said groups of adjacent teeth being separated by said spaced teeth.

9. The tire rasp blade of claim 8 wherein said groups of adjacent teeth are separated by one pair of spaced teeth.

10. The tire rasp blade of claim 8 wherein said group of adjacent teeth are separated by more than one pair of spaced teeth.

11. The tire rasp blade of claim 8 wherein the adjacent teeth in any one group are displaced at a first common angle and the adjacent teeth in another group are displaced at a second common angle.

12. The tire rasp blade of claim 11 wherein said first and second common angles are supplementary.

13. The tire rasp blade of claim 12 wherein said working edge portion comprises two groups of adjacent teeth and three groups of spaced teeth.

14. A tire rasp blade for use in a tire buffing machine, said tire rasp blade comprising:
   a generally planar body portion adapted for assembly in a rotating hub of the tire buffing machine; and
   a working edge portion positioned on said body portion to protrude from the hub periphery and comprising a plurality of teeth having a common size and configuration, said teeth also having leading and trailing edges, said working edge portion having a plurality of said teeth separated by a generally elliptical cutout and positioned adjacent one another such that the trailing edge of one adjacent tooth and the leading edge of the next following adjacent tooth each terminates in substantially a common plane normal to the plane of said body portion, said working edge portion also having a plurality of said teeth in spaced relation.

15. A tire rasp blade for use in a tire buffing machine, said tire rasp blade comprising:
   a body portion adapted for assembly in a rotating hub of the tire buffing machine; and
   a working edge portion positioned on said body portion to protrude form the hub periphery and comprising a plurality of teeth having a common size and configuration, said teeth also having leading edges that attach the tire surface as the hub rotates in the operation of the buffing machine and trailing edges there behind, said plurality of teeth including a combination of adjacent teeth separated by generally elliptical cutouts and spaced teeth separated by generally circular cutouts, and said adjacent teeth comprising between about 25% to 50% of the length of said working edge portion.

16. The tire rasp blade of claim 15 wherein said adjacent teeth are positioned in groups along said working edge portion of said blade, each group including between two and seven adjacent teeth.

17. The tire rasp blade of claim 16 wherein all the adjacent teeth of any one of said groups are angularly displaced from said body portion at a common angle.

18. The tire rasp blade of claim 15 wherein all the adjacent teeth are angularly displaced from said body portion at a common angle.

19. The tire rasp blade for use in a tire buffing machine, said tire rasp blade comprising:
   a body portion adapted for assembly in a rotating hub of the tire buffing machine; and
   a working edge portion positioned on said body portion to protrude form the hub periphery and comprising a plurality of teeth having leading and trailing edges, said working edge portion having groups of said teeth separated by generally elliptical cutouts and positioned adjacent one another and also having groups of said teeth separated by generally circular cutouts in spaced relation; said groups of adjacent teeth comprising at least three teeth per group and said groups of spaced teeth having at least three teeth per group.

20. The tire rasp blade of claim 19 wherein the trailing edge of one adjacent tooth and the leading edge of the next following adjacent tooth each terminates in substantially a common plane normal to the plane of said body portion.

21. A tire rasp blade for use in a tire buffing machine, said tire buffing machine; and
   a working edge portion positioned on said body portion to protrude for the hub periphery and comprising a plurality of teeth having leading edges that attack the tire surface as the hub rotates in the operation f the buffing machine and trailing edges there behind, some of said teeth being defined by narrow generally elliptical shaped cutouts thereby forming pairs of adjacent teeth and other of said teeth being defined by wide generally circular shaped cutouts thereby forming pairs of spaced teeth.

22. The tire rasp blade of claim 21 wherein all of said teeth are of a substantially common size and said narrow and wide cutouts have a substantially common depth.

23. The tire rasp blade of claim 21 wherein said adjacent teeth make up at least 25% of the length of said working edge portion.

24. A tire rasp blade for use in a tire buffing machine, said tire raps blade comprising:
   a body portion adapted for assembly in a rotating hub of the tire buffing machine; and
   a working edge portion positioned on said body portion to protrude from the hub periphery and comprising a plurality of teeth having leading edges that attack the tire surface as the hub rotates in the operation of the buffing machine and trailing edges there behind, said plurality of teeth having a substantially common size and configuration and including a combination of adjacent teeth and spaced teeth, and said adjacent teeth comprising at least 25% of the length of said working edge portion.

* * * * *

UNITED STATES PATENT AND TRADEMARK OFFICE
CERTIFICATE OF CORRECTION

PATENT NO. : 5,075,942

DATED : December 31, 1991

INVENTOR(S) : Wayne E. Jensen

It is certified that error appears in the above-identified patent and that said Letters Patent is hereby corrected as shown below:

In column 6, line 33, change "attach" to --attack--

In column 7, line 9, change "f" to --of--

In column 7, line 2, change "said tire buffing machine; and" to
-- tire rasp blade comprising:
   a body portion adapted for assembly in a rotating hub of the tire
   buffing machine; and--

Signed and Sealed this

Sixth Day of July, 1993

Attest:

MICHAEL K. KIRK

*Attesting Officer*     Acting Commissioner of Patents and Trademarks